(12) United States Patent
Whitechapel et al.

(10) Patent No.: US 12,072,849 B2
(45) Date of Patent: Aug. 27, 2024

(54) FLEXIBLE VIRTUALIZATION OF APPLICATION DATA FOR SPECIFIED SYSTEM LOCATIONS

(71) Applicant: Microsoft Technology Licensing, LLC, Redmond, WA (US)

(72) Inventors: David Andrew Whitechapel, Seattle, WA (US); Hart Daniel Wilson, Auburn, WA (US); Anis Mohammed Khaja Mohideen, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 3 days.

(21) Appl. No.: 17/209,675

(22) Filed: Mar. 23, 2021

(65) Prior Publication Data

US 2022/0309041 A1    Sep. 29, 2022

(51) Int. Cl.
*G06F 16/188*    (2019.01)
*G06F 8/61*    (2018.01)
*G06F 8/65*    (2018.01)
*G06F 16/176*    (2019.01)

(52) U.S. Cl.
CPC .............. *G06F 16/188* (2019.01); *G06F 8/61* (2013.01); *G06F 8/65* (2013.01); *G06F 16/1774* (2019.01)

(58) Field of Classification Search
CPC ...... G06F 16/188; G06F 16/1774; G06F 8/61; G06F 8/65
See application file for complete search history.

(56) References Cited

U.S. PATENT DOCUMENTS

| | | | |
|---|---|---|---|
| 5,903,753 A | 5/1999 | Bramnick et al. | |
| 7,206,819 B2* | 4/2007 | Schmidt | G06F 16/192 709/216 |
| 7,296,025 B2* | 11/2007 | Kung | G06Q 10/10 707/999.102 |
| 7,676,813 B2* | 3/2010 | Bisset | G06F 9/45537 718/100 |

(Continued)

OTHER PUBLICATIONS

"Support Package.DisplayName for Win32 desktop apps?", Retrieved From : https://github.com/microsoft/ProjectReunion/issues/81, Jun. 14, 2020, 12 Pages.

(Continued)

*Primary Examiner* — Lewis A Bullock, Jr.
*Assistant Examiner* — Theodore E Hebert

(57) ABSTRACT

In non-limiting examples of the present disclosure, systems, methods and devices for selectively virtualizing software application functions are presented. An application package for a containerized software application may be received. The application package may comprise an application manifest and a virtualization exclusion for a first location of a global file system of the computing device. The containerized software application may be installed in a container comprising a virtual file system. An indication to write a first new file at the first location may be received by the containerized software application. A determination may be made that the first location comprises the virtualization exclusion. The first new file may be written to the first location of the global file system based on the determination that the first location comprises the virtualization exclusion.

20 Claims, 11 Drawing Sheets

(56) References Cited

U.S. PATENT DOCUMENTS

| | | | | |
|---|---|---|---|---|
| 8,117,559 | B2* | 2/2012 | Laborczfalvi | G06F 9/451 |
| | | | | 715/781 |
| 8,171,483 | B2* | 5/2012 | Nord | G06F 8/60 |
| | | | | 719/329 |
| 8,245,035 | B2* | 8/2012 | Khalidi | G06F 9/44505 |
| | | | | 707/738 |
| 8,321,667 | B2* | 11/2012 | Bradshaw | G06F 9/455 |
| | | | | 713/153 |
| 8,667,512 | B2* | 3/2014 | Mager | G06F 21/6218 |
| | | | | 717/121 |
| 8,843,903 | B1* | 9/2014 | Blaser | G06F 8/61 |
| | | | | 717/135 |
| 9,104,893 | B2* | 8/2015 | Gallardo | G06F 21/70 |
| 9,773,102 | B2* | 9/2017 | Graham | G06F 21/335 |
| 10,607,002 | B2* | 3/2020 | Ilaiwi | G06F 21/53 |
| 10,986,131 | B1* | 4/2021 | Kruse | H04L 63/10 |
| 11,074,323 | B2* | 7/2021 | Schultz | G06F 21/6218 |
| 2009/0106780 | A1* | 4/2009 | Nord | G06F 8/60 |
| | | | | 719/329 |
| 2013/0067600 | A1* | 3/2013 | Graham | G06F 21/335 |
| | | | | 726/30 |
| 2013/0290960 | A1* | 10/2013 | Astete | G06Q 40/02 |
| | | | | 718/1 |
| 2016/0191466 | A1* | 6/2016 | Pernicha | H04L 63/20 |
| | | | | 726/1 |
| 2017/0249472 | A1* | 8/2017 | Levy | G06F 21/6245 |
| 2018/0060567 | A1* | 3/2018 | Ilaiwi | G06F 21/6218 |
| 2019/0180003 | A1* | 6/2019 | Schultz | G06F 16/1748 |
| 2019/0340705 | A1* | 11/2019 | Sethuraman | G06Q 50/01 |
| 2020/0065510 | A1* | 2/2020 | Ojha | G06N 5/022 |
| 2020/0293347 | A1* | 9/2020 | Buckley | G06F 16/119 |
| 2022/0027485 | A1* | 1/2022 | Caldarale | G06F 9/4406 |

OTHER PUBLICATIONS

"Understanding the Registry on Windows", Retrieved From: https://confluence.uconn.edu/ikb/desktop-support/windows-10-support/understanding-the-registry-on-windows, Retrieved Date: Feb. 6, 2021, 10 Pages.

Jimha, et al., "Understanding How Packaged Desktop Apps Run on Windows", Retrieved From: https://docs.microsoft.com/en-us/windows/msix/desktop/desktop-to-uwp-behind-the-scenes, Jan. 30, 2020, 6 Pages.

Lin, et al., "Operating system functionality on Azure App Service", Retrieved From: https://docs.microsoft.com/en-us/azure/app-service/operating-system-functionality, Oct. 30, 2018, 7 Pages.

Siddiqui, Aamir, "Android 10 Lets Developers Ask Users If They Want to Retain App Data Before Uninstalling", Retrieved from: https://web.archive.org/web/20201111223916/https://www.xda-developers.com/android-10-manifest-flag-developers-retain-app-data-before-uninstalling/, Nov. 8, 2019, 7 Pages.

* cited by examiner

FLEXIBLE VIRTUALIZATION OF APPLICATION DATA FOR SPECIFIED SYSTEM LOCATIONS

BACKGROUND

In traditional environments, software applications can create, update and delete files in most places in a file system, and for environments with registries, software applications can traditionally create, update and delete entries in the system registry. These files and registry entries are visible to other applications on the system. However, there are disadvantages to allowing applications to write directly to the global file system and global registry. For example, files and registry entries written to the global file system and global registry often do not need to be visible to other applications on the system, and they are often left behind to clutter up the system when the application is uninstalled.

Some newer applications utilize containers for virtualizing application writes so that only the application that writes the files and registry entries can see them, and those files and registry entries are automatically removed when the application is uninstalled. However, there are valid scenarios where it would be beneficial for an application's files and/or registry entries to be visible to other applications. In addition, other applications may require that files and/or registry entries persist even after the source application is uninstalled.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for selectively virtualizing software application data. According to a first example, a computer-implemented method is provided. The computer-implemented method comprises receiving, by a computing device, an application package for a containerized software application, the application package comprising an application manifest and a virtualization exclusion for a first location of a global file system of the computing device; installing the containerized software application in a container comprising a virtual file system; receiving, by the containerized software application, an indication to write a first new file at the first location; determining that the first location comprises the virtualization exclusion; and writing, based on the determination that the first location comprises the virtualization exclusion, the first new file to the first location of the global file system.

According to an additional example, a system for selectively virtualizing software application data is provided. The system comprises a memory for storing executable program code; and one or more processors, functionally coupled to the memory, the one or more processors being responsive to computer-executable instructions contained in the program code and operative to: receive, by a computing device, an application package for a containerized software application, the application package comprising an application manifest and a virtualization exclusion for a first location of a global file system of the computing device; install the containerized software application in a container comprising a virtual file system; receive, by the containerized software application, an indication to write a first new file at the first location; determine that the first location comprises the virtualization exclusion; and write, based on the determination that the first location comprises the virtualization exclusion, the first new file to the first location of the global file system.

In another example, a computer-readable storage device is provided. The computer-readable storage device comprises executable instructions that, when executed by one or more processors, assists with selectively virtualizing software application data, the computer-readable storage device including instructions executable by the one or more processors for: receiving an application package for a containerized software application, the application package comprising an application manifest and a virtualization exclusion for a first location of a global file system of the computer-readable storage device; installing the containerized software application in a container comprising a virtual file system; receiving, by the containerized software application, an indication to write a first new file at the first location; determining that the first location comprises the virtualization exclusion; and writing, based on the determination that the first location comprises the virtualization exclusion, the first new file to the first location of the global file system.

BRIEF DESCRIPTION OF THE DRAWINGS

Non-limiting and non-exhaustive examples are described with reference to the following figures.

DETAILED DESCRIPTION

Figure 1:
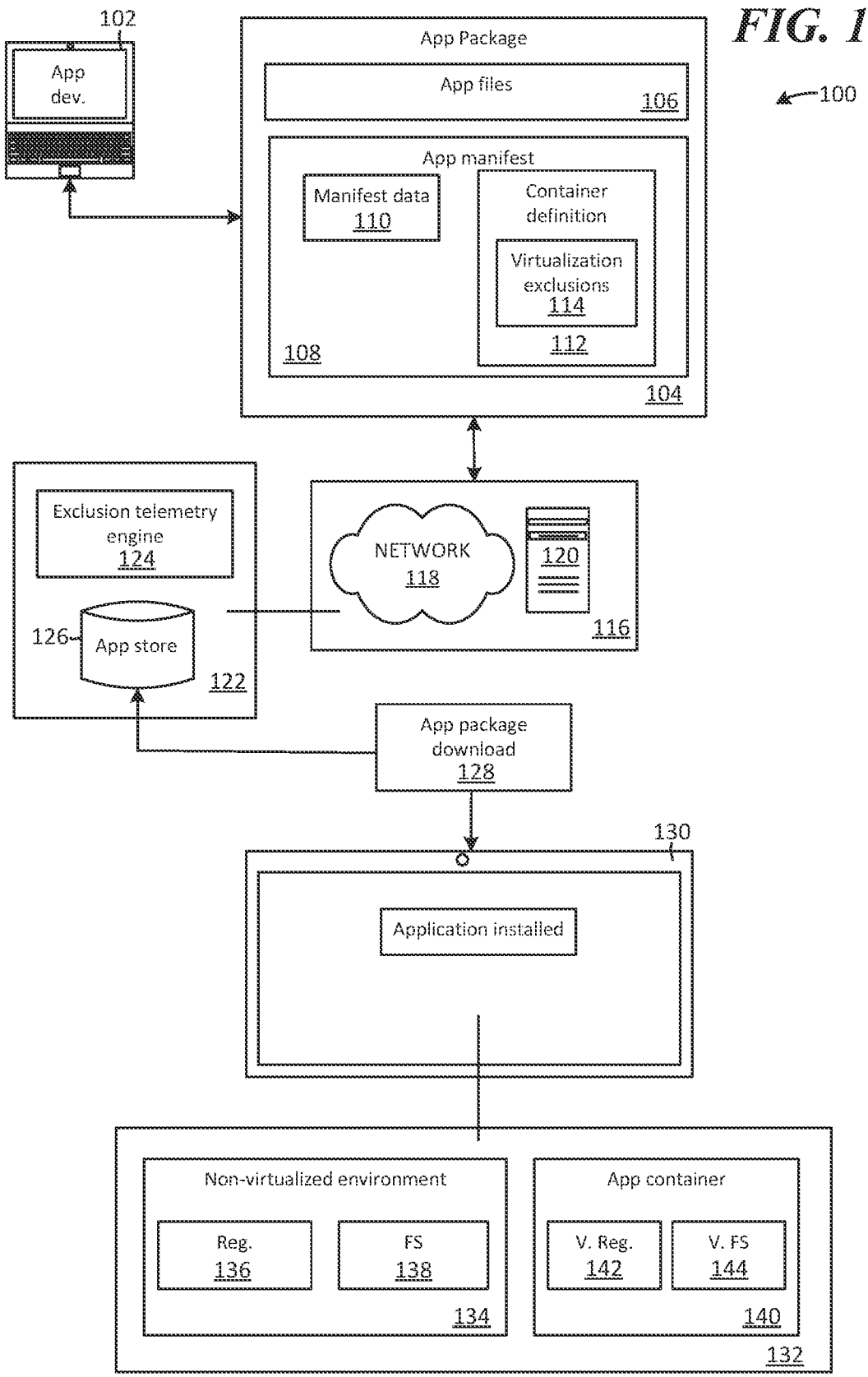
FIG. 1 is a schematic diagram illustrating an example distributed computing environment for selectively virtualizing software application data.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The various embodiments and examples described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the claims.

Examples of the disclosure provide systems, methods, and devices for selectively virtualizing software application data. Examples provide mechanisms for creating, saving, maintaining, executing, and deleting containerized software applications that include specific exclusions to file system and/or registry virtualization rules. As disclosed herein, the "registry" describes a low-level operating system datastore, which stores operating system configuration information (such as settings) as well as certain application configurations information (such as settings) as permitted by the operating system. A containerized software application is an application that runs in a container. Containers are a technology for packaging and running software applications across diverse environments on-premises and in the cloud. Containers provide a lightweight, isolated environment that makes applications easier to develop, deploy, and manage Containers build on top of the host operating system's kernel. While containers share the host operating system's kernel, they do not get unfettered access to it. Rather, containers access a virtualized version of a file system and registry. Writes made by containerized software applications are traditionally only made to a virtual file system and/or a virtual registry. Other applications executed by a computing device typically do not have access to the virtual file system and/or virtual registry. Additionally, when a containerized software application is deleted, all of the data that was written by the containerized software application to the virtual file system and/or registry is typically deleted along with it.

Examples described herein provide mechanisms for creating virtualization exceptions for specific locations of a file system and/or registry. In some examples, an application package for a containerized software application may include virtualization exceptions for one or more locations in the file system or registry where, rather than writing to a virtual location of those one or more locations, the application may write to the global locations (e.g., a non-virtualized location in the global file system, a non-virtualized location in the global registry). In some examples, only locations that are user-specific (e.g., user account specific) may be included as virtualization exclusions in a software application package. In some examples, only user-specific application data file system locations (e.g., % UserProfileA %\AppData, % UserProfileB %\AppData, % UserProfileA %\AppData\X, % UserProfileB %AppData\Y) and/or user-specific hives or keys in registry locations (e.g., one or more locations/keys in HKEY_CURRENT_USER) may be included as virtualization exclusions in a software application package. Thus, when the virtualization exclusions are applied and a containerized software application writes to a non-virtualized location, other applications are provided with access to that data, unlike with the writes made to the virtualized locations. Further, when a containerized application is uninstalled, the data written by the application to the unvirtualized locations may be maintained, while the application files and the writes made to the virtualized locations are deleted.

The systems, methods, and devices described herein provide technical advantages for executing software applications. Allowing application developers to include specific exceptions to container virtualization rules allows containerized software applications to interact with other application data, and other applications to interact with containerized software application data for specifically excluded locations, while maintaining the primary benefits of containerization (e.g., decreased system rot, increased security, less clutter on the system). That is, aspects described herein provide a compromise where some files and/or registry entries can be made visible and can persist, while still protecting the rest of the file system and/or registry, and still providing the ability to remove unnecessary files and/or registry entries upon application uninstall.

FIG. 1 is a schematic diagram illustrating an example distributed computing environment 100 for selectively virtualizing software application data. Computing environment 100 includes computing device 102, application package 104, network and processing sub-environment 116, application store sub-environment 122, application package download element 128, computing device 130, and storage 132 for computing device 130.

Computing device 102 is illustrative of any computing device that a software application developer may utilize in creating a software application. A developer may create a software application utilizing one or more software tools (e.g., a software development kit (SDK), an integrated development environment, a visual code designer). The software application developer may create an application package that may be uploaded to an application store and downloaded and installed by downstream users.

In this example, the software application developer has created application package 104, which comprises application files 106 and application manifest 108. A containerized software application may comprise more, fewer, or different components than those illustrated and described in relation to application package 104. Application manifest 108 comprises manifest data 110, container definition 112, and virtualization exclusions 114. Application package 104 is a downloadable and installable containerized software application package. The application processes of a containerized software application run inside a container, unless specifically excluded, and are isolated using file system and/or registry virtualization. A containerized software application can read the global file system and/or global registry for the computing device it is installed on. Further, except where specifically excluded, a containerized software application writes to its own virtual file system and/or registry (e.g., in the container), and the data that is written to that virtual file system is deleted upon application uninstall or reset. As described herein, other applications do not have access to the virtual file system or virtual registry of a containerized software application, but they do have access to data written to a global file system or global registry, based on virtualization exclusions, by a containerized software application.

Application files 106 may comprise payload files that are application code files and assets that are created when the developer creates the application. Application manifest 108 includes manifest data 110, which may comprise information a computer system needs to deploy, display, and update the software application. This information may include package identity, package dependencies, required capabilities, visual elements, and extensibility points. In examples, the information in manifest data 110 may be comprised in a document (e.g., XML file). Container definition 112 may comprise its own file or it may be included in manifest data 110. A container definition may define information a computer system needs to configure a container, including where an application may send application writes to (e.g., a virtualized file system, a virtualized registry). According to aspects descried herein, a container definition may also include virtualization exclusions 114, which define specific exclusions to purely virtualizing application writes. That is, a developer may specifically define in an application package (e.g., application package 104) that application writes to one or more file system locations or registry locations be made to the global file system or global registry rather than to a virtual file system or virtual registry. In additional examples, a software application service may analyze virtualization exclusions for a plurality of applications and automatically unvirtualized specific locations of a global file system or global registry for a computing device. In some examples, only locations that are user-specific (e.g., user account specific) may be included as virtualization exclusions in a software application package. In some examples, only user-specific application data file system locations (e.g., % UserProfileA %\AppData, % UserProfileB %\AppData, % UserProfileA %\AppData\X, % UserProfileB %\AppData\Y) and/or user-specific hives or keys in registry locations (e.g., one or more locations/keys in HKEY_CURRENT_USER) may be included as virtualization exclusions in a software application package.

Network and processing sub-environment 116 includes network 118 and server computing device 120. Any of the computing devices described herein may communicate with one another via a network, such as network 118. Server computing device 120 is illustrative of one or more server computing devices that may operate one or more cloud-based services. For example, network and processing sub-environment 116 may include or be associated with a software application service, which is illustrated in application store sub-environment 122. Application store sub-environment 122 includes application store 126 and exclusion telemetry engine 124. Application store 126 may comprise a plurality of software application packages that have been uploaded by developers and which may be downloaded by downstream users. For example, application package 104 may be uploaded to application store 126 via network 118 and downloaded by a downstream user via network 118 and a computing device such computing device 130. Although exclusion telemetry engine 124 is illustrated as being executed in the cloud, it should be understood that it may be all or partially executed by a client computing device (e.g., computing device 130).

Exclusion telemetry engine 124 may analyze virtualization exclusion data for a plurality of containerized software applications and automatically determine whether one or more file system and/or registry locations should be unvirtualized for one or more software applications. For example, if a threshold number or percentage of containerized software application developers for a type of software application (e.g., a game type application, an image editing type application) have excluded a same location from virtualization, exclusion telemetry engine 124 may automatically exclude that location from virtualization for one or more other applications (e.g., applications of a same type). In some examples, exclusion telemetry engine 124 may perform operations including receiving virtualization exclusion data from a plurality of containerized software applications; analyzing the virtualization exclusion data; determining, based on the analysis of the virtual exclusion data, a virtualization exclusion data value for a specific location in a global file system of a computing device; determining that the virtualization exclusion data value exceeds a threshold value; and automatically converting the specific location to a virtualization exclusion location for at least one other containerized software application.

In this example, a user accesses application store 126 via network 118 and computing device 130, and downloads application package 104, as illustrated by application package download element 128. Although application package 104 is illustrated as being downloaded from application store 126, it should be understood that application package 104 may be downloaded from a website or from a connected computing device or storage location. Computing device 130 includes storage 132, which comprises application container 140 and non-virtualized environment 134. The application container 140 is the container configured by container definition 112, which includes the virtualized locations where the application writes to unless specifically excluded from virtualization via virtualization exclusions 114. In this example, those locations are virtual registry 142, and virtual file system 144. The non-virtualized environment 134 includes global registry 136 and global file system 138. According to some examples, entries to global registry 136 and global file system 138 may only be written to by the application at runtime (e.g., they are not written at application install). That is, application manifest 104 declares the unvirtualized locations the application can write to (e.g., via virtualization exclusions 114), but the application may not actually write to those locations until sometime at runtime. In other examples, entries to global registry 136 and global file system 138 may be written to at application install time and at runtime depending on what locations application manifest 104 declares as being unvirtualized and what locations are written to at application install. Further, as described above, an application package may only include specific locations in global registry 136 and/or specific locations in global file system 138 as being excluded from virtualization via virtualization exclusions 114. Any such non-virtualized writes to non-virtualized environment 134 may be accessed by other applications executed by computing device 130, and those writes/files may not be deleted upon uninstall of the containerized software application.

Figure 2:
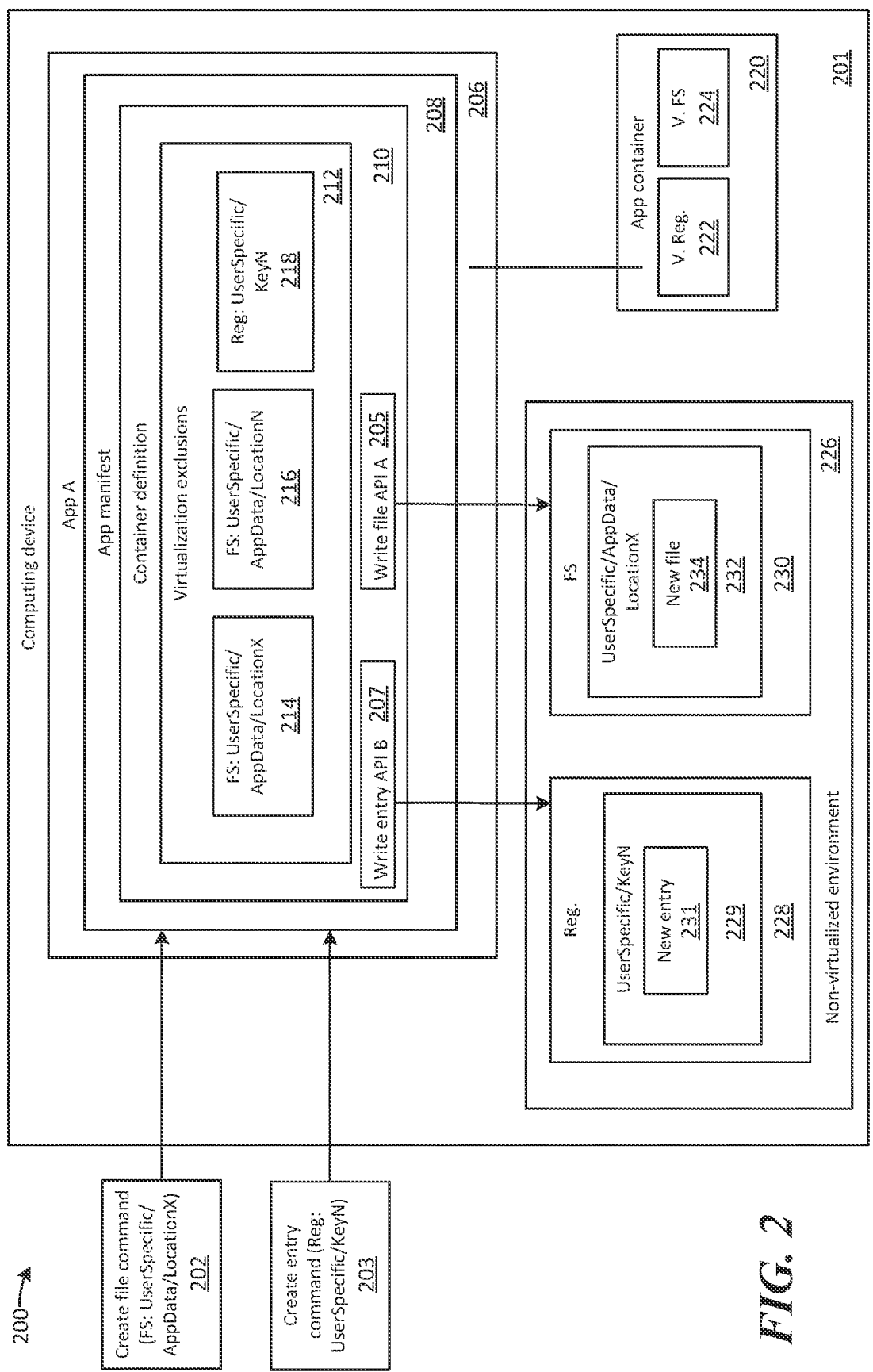
FIG. 2 is a block diagram of a computing device and a containerized software application that may selectively virtualize software application data.

FIG. 2 is a block diagram 200 of a computing device 201 and a containerized software application 206 that may selectively virtualize software application data. Computing device 201 comprises containerized software application 206, application container 220, and non-virtualized environment 226.

Containerized software application 206 includes application manifest 208, container definition 210, and virtualization exclusions 212. Application manifest 208 may comprise information computing device 201 needs to deploy, display, and update the containerized software application 206. This information may include package identity, package dependencies, required capabilities, visual elements, and extensibility points. In examples, the information in application manifest 208 may be comprised in a document (e.g., XML file). Container definition 210 may comprise its own file or it may be included in application manifest 208. Container definition 210 may define information computing device 201 needs to configure a container (e.g., container 220), including where an application may send application writes to (e.g., virtualized file system, virtualized registry).

In this example, container definition 210 also includes virtualization exclusions 212, which are specific locations in non-virtualized environment 226 where containerized software application 206 may write data to. That is, a developer may have included in an application package for containerized software application 206, specific exclusions to the virtualization rules provided by container definition 210. In this example, virtualization exclusions include first file system virtualization exclusion 214, second file system virtualization exclusion 216, and first registry virtualization exclusion 218. In some examples, a developer may only specify that virtualization exclusions be applied to user-specific locations and/or user-specific application data locations of a global file service or global registry. Other than virtualization exclusions 212, all other writes made by containerized software application 206 are mandated by application manifest 208 and/or associated application programming interfaces (APIs) to be made to either virtual registry 222 or virtual file system 224 in application container 220.

In this example, a first indication 202 to create a first file by containerized software application 206 is received by computing device 201. First indication 202 includes a command which defines a location where first indication 202 indicates the file should be created. In this specific example, first indication 202 includes the location "FS: UserSpecific/AppData/LocationX". The command and/or location may be received by containerized software application 206 and a determination may be made based on container definition 210 and its virtualization exclusions 212, that the location "FS: UserSpecific/AppData/LocationX" corresponds to first file system virtualization exception 214. As such, write file API A 205 may write the file corresponding first indication 202 directly to non-virtualized environment 226, and specifically to non-virtualized (e.g., global) file system 230, as indicated by new file 234 in "UserSpecific/AppData/LocationX" location 232.

Further in this example, a second indication 203 to create an entry by containerized software application 206 is received by computing device 201. Second indication 203 includes a command which defines a location where second indication 203 indicates the entry should be created. In this specific example, second indication 203 includes the location "Reg: UserSpecific/KeyN". The command and/or location may be received by containerized software application 206 and a determination may be made based on container definition 210 and its virtualization exclusions 212, that the location "Reg: UserSpecific/KeyN" corresponds to first registry virtualization exclusion 218. As such, write entry API B 207 may write the entry corresponding to second indication 203 directly to non-virtualized environment 226, and specifically to non-virtualized (e.g., global) registry 228, as indicated by new entry 231 in "UserSpecific/KeyN" location 229.

Any other applications executed by computing device 201 may have access to data in non-virtualized environment 226, including data written to non-virtualized environment 226 by containerized software application 206. Alternatively, any other applications executed by computing device 201 may not have access to data in application container 220 (e.g., to data in virtual registry 222 and virtual file system 224), which is the default location where data is written to by containerized software application 206. Additionally, upon receiving a command to delete containerized software application 206, all the data in application container 220 may be deleted, and all of the data in non-virtualized environment 226 may be maintained in memory, including data written by containerized software application 201.

Figure 3:
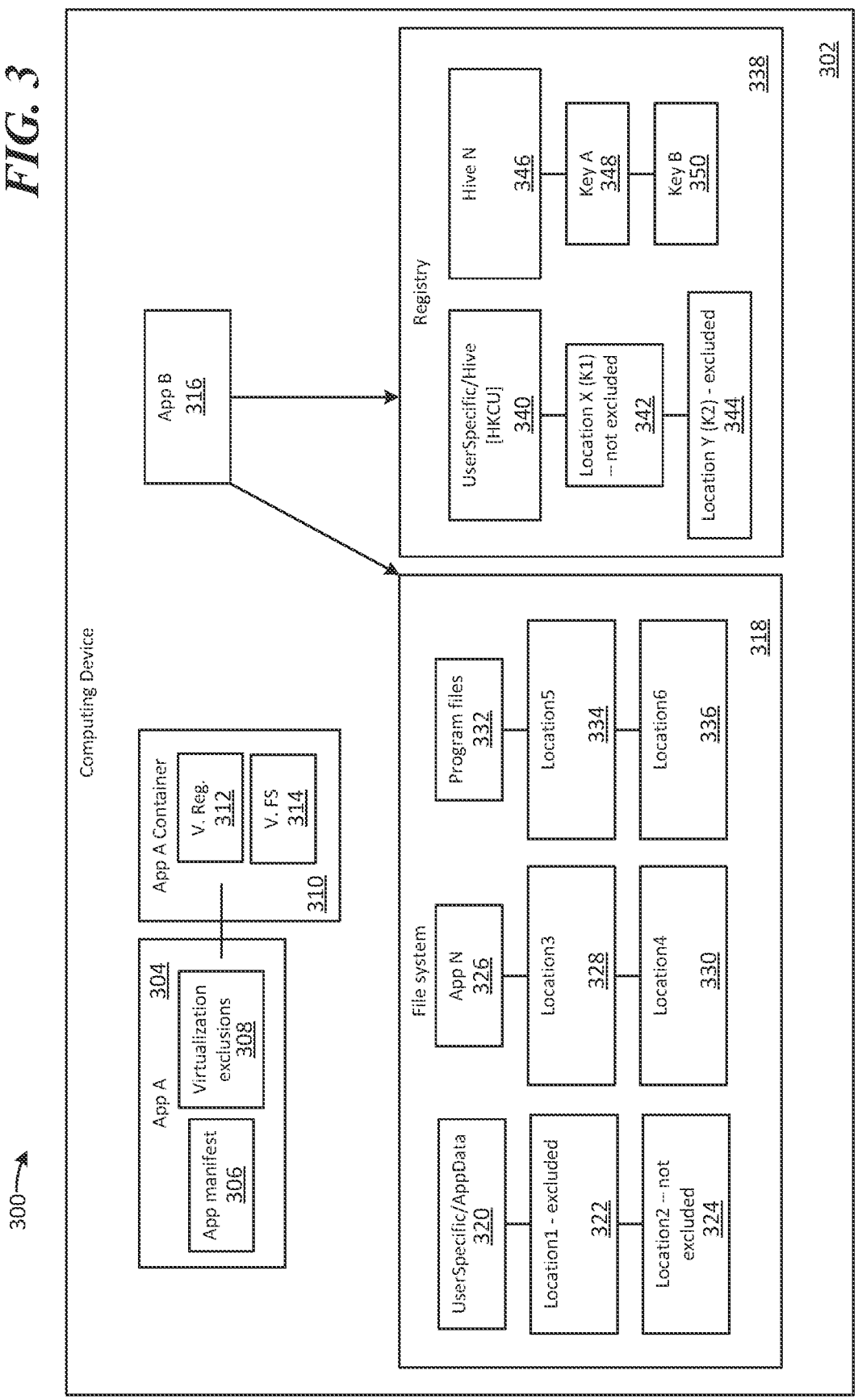
FIG. 3 illustrates a block diagram of a computing device, a containerized software application installed on the computing device, and another software application installed on the computing device that may interact with non-virtualized data created by the containerized software application.

FIG. 3 illustrates a block diagram of a computing device 302, a containerized software application 304 installed on the computing device 302, and another software application installed on the computing device 302 that may interact with non-virtualized data created by the containerized software application 304. Computing device 302 includes containerized software application 304 (application A), application A container 310, application B 316, non-virtualized (e.g., global) file system 318, and non-virtualized (e.g., global) registry 338.

Containerized software application 304 includes application manifest 306 and virtualization exclusions 308. Application manifest 306 may comprise information computing device 302 needs to deploy, display, and update containerized software application 304. This information may include package identity, package dependencies, required capabilities, visual elements, and extensibility points. In examples, the information in application manifest 306 may be comprised in a document (e.g., XML file). Virtualization exclusions 308 may be included in a container definition for containerized software application 304. Virtualization exclusions 308 may include one or more specific locations in non-virtualized file system 318 and/or non-virtualized registry 338 where the developer of containerized software application 304 has specified that writes be made by containerized software application 304 rather than the default action of writing to virtualized locations in, or specified by, its container (e.g., application A container 310).

Non-virtualized file system 318 includes user-specific application data root folder 320, application N root folder 326, and program files root folder 332. According to examples, containerized software application developers may only be able to exclude, from virtualization, user-specific application data locations (locations that have unique data in them based on the user account logged in to computing device 302 and/or containerized software application 304) in non-virtualized file system 318. For example, for non-virtualized file system 318, virtualization exclusions 308 may only include exclusions for folders in user-specific application data root folder 320 (e.g., Location1 folder 322, Location2 folder 324). In this example only Location1 folder 322 is included in virtualization exclusions 308 (the developer did not exclude location2 324 from virtualization). Therefore, when containerized software application 304 receives an indication to write to Location1 322 it will write to that location in non-virtualized file system 318 rather than a corresponding virtualization of Location1 322 in virtual file system 314 of application A container 310.

Application N root folder 326 includes Location3 folder 328 and Location4 folder 330, neither of which include data that is unique to specific users or user accounts of computing device 302 or application N. Similarly, program files root folder 332 includes Location5 folder 334 and location6 folder 336, neither of which include data that is unique to specific users or user accounts of computing device 302. Thus, the containerized software application 304 may not exclude locations/folders in application N root folder 326 or program files root folder 332 from virtualization. As such, data that containerized software application 304 writes to those locations will be automatically written to corresponding virtualized locations in virtual file system 314. That data will also be deleted when containerized software application 304 is deleted. In contrast, the data that is written by containerized software application 304 to Location1 folder 322 may be maintained even after containerized software application 304 is deleted. However, in some examples, containerized software application 304 and/or application manifest 306 may indicate that even non-virtualized files that were created by containerized software application 304 be deleted upon deletion of the application.

Non-virtualized registry 338 includes user-specific hive 340 and hive N 346, which does not include data that is user-specific. According to examples, containerized software application developers may only be able to exclude, from virtualization, registry hives and/or registry keys that are user-specific data locations (locations that have unique data in them based on the user account logged into computing device 302 and/or containerized software application 304) in non-virtualized registry 338. For example, for non-virtualized registry 338, virtualization exclusions 308 may only include exclusions for registry keys in user-specific hive 340. In this example, only Location Y (Key 2) 344 is included in virtualized exclusions 308 (the developer did not exclude Location X (Key 1) 342). Therefore, when containerized software application 304 receives an indication to write to Location Y (Key 2) 344 it will write to that location in non-virtualized registry 338 rather than a corresponding virtualization of Location Y (Key 2) 344 in virtual registry 312 of application A container 310. Alternatively, when containerized software application 304 receives an indication to write to Location X (Key 1) 342 it will write to that location in virtual registry 312.

Hive N 346 includes Key A 348 and Key B 350, neither of which include data that is unique to specific users or user accounts of computing device 302. Thus, the containerized software application 304 may not exclude locations/keys in Hive N 346. As such, data that containerized software application 304 writes to those locations will be automatically written to corresponding virtualized locations in virtual registry 312. That data will also be deleted when containerized software application 304 is deleted. In contrast, the data that is written by containerized software application 304 to Location Y (Key 2) 344 may be maintained even after containerized software application 304 is deleted. However, in some examples, containerized software application 304 and/or application manifest 306 may indicate that even non-virtualized writes to the registry (e.g., non-virtualized registry 338) that were made by containerized software application 304 be deleted upon deletion of the application.

As illustrated, application B 316 has access to all of the data in non-virtualized file system 318 and non-virtualized registry 338, including data written to those non-virtualized locations by containerized software application 304. However, application B does not have access to the data in virtual registry 312 or virtual file system 314 in application A container 310. Allowing containerized software application developers to declare certain user-specific locations in the file system and/or registry as virtualization exceptions provides a degree of flexibility to allow their application data to be interacted with by other applications while also maintaining the benefits of containers (e.g., decreased system rot, increased security, less clutter on the system). For example, a game modification (e.g., skin mod) application developer may want its modifications to be interacted with via the game(s) that the modifications are being made for, while also wanting its application data (e.g., game modifications) to persist even when the application is deleted. The disclosed infrastructure meets these goals, while maintain the advantages of containerized applications. Similarly, a productivity document application developer may want other applications to have access to the documents it generates and the data in those documents. Such a developer may specify that documents generated by the application in association with a user account be saved to a non-virtualized file system where other applications may interact with them. Those documents may then be maintained in the non-virtualized file system after the application is deleted, therefore leaving any dependencies in reliant other documents (e.g., reliant values in other applications) as maintained values rather than broken links.

Figure 4:
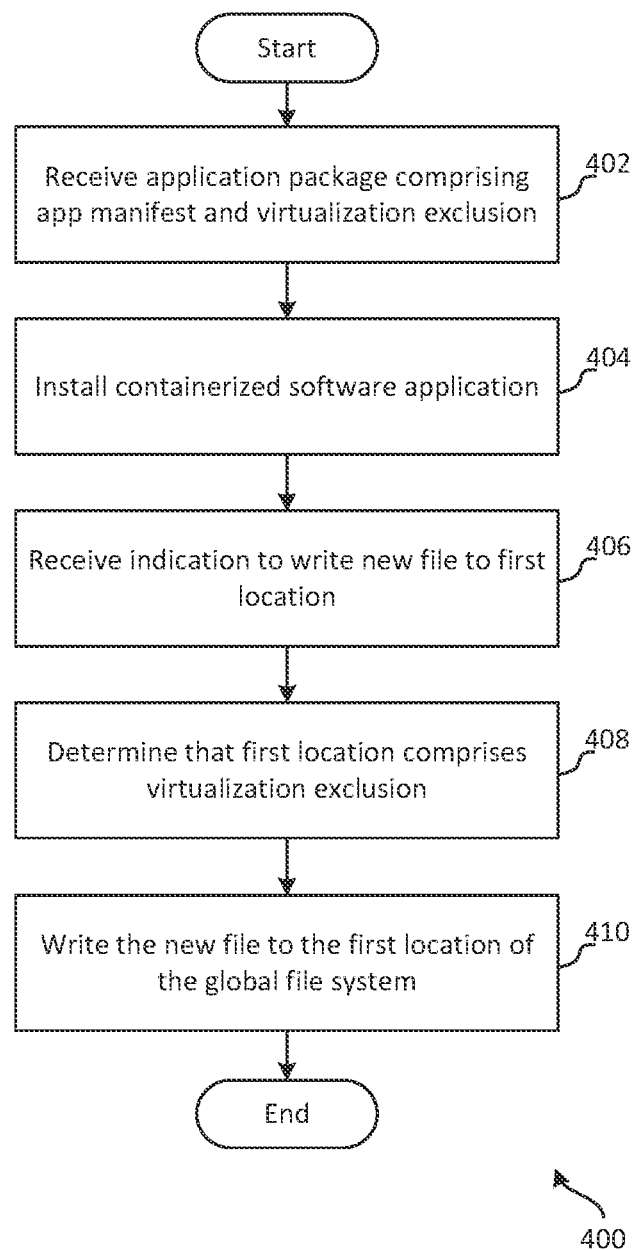
FIG. 4 is an exemplary method for selectively virtualizing data for a containerized software application.

FIG. 4 is an exemplary method 400 for selectively virtualizing data for a containerized software application. The method 400 begins at a start operation and flow moves to operation 402.

At operation 402 an application package for a containerized software application is received by a computing device. The application package may comprise an application manifest and a virtualization exclusion for a first location of a global file system of the computing device. The application may be downloaded from an application store, from a website, or from a different storage location (e.g., a USB drive, a connected second computing device). The application manifest may comprise manifest data, a container definition, and virtualized exclusions, amongst other data. The manifest data may comprise information a computer system needs to deploy, display, and update the containerized software application. This information may include package identity, package dependencies, required capabilities, visual elements, and extensibility points. In examples, the manifest data may be comprised in a document (e.g., XML file).

The virtualization exclusion may be comprised in the application manifest and/or a container definition. The virtualization exclusion may define specific exclusions to virtualizing application writes by the containerized software application. That is, a developer may specifically define in an application package that application writes to one or more file system locations or registry locations be made to the global file system or global registry rather than to a virtual file system or virtual registry. Although in this example only a single virtualization exclusion is included in the application package, more than one virtualization exclusion may be included in an application package. In examples, only virtualization exclusions for user-specific locations (e.g., locations where application data associated with specific user accounts is stored) may be included in an application package for a containerized software application.

From operation 402 flow continues to operation 404 where the containerized software application is installed in a container comprising a virtual file system. The container is an isolated, lightweight silo for running the application on the host operating system. The container may comprise a virtual file system and/or a virtual registry where writes made by the containerized software application may be made. The virtual file system and/or virtual registry may also include virtualized copies of the global file system and/or global registry.

From operation 404 flow continues to operation 406 where an indication to write a first new file at the first location is received by the containerized software application. The indication may originate from the containerized application or from one or more other applications or programs of the computing device. The indication may be derived from a user input or from an automated action taken by the software application.

From operation 406 flow continues to operation 408 where a determination is made that the first location comprises the virtualization exclusion. The determination may be made when a job object corresponding to the write indication is provided with the virtualization exclusion for the containerized software application.

From operation 408 flow continues to operation 410 where the first new file is written to the first location of the global file system based on the determination that the first location comprises the virtualization exclusion. That is, the containerized software application, in association with a write API and/or kernel driver determines that the location where the write is to take place is a non-virtualized file system location, and as such, the write is made to the global file system location rather than to the virtualized location in the container.

From operation 410 flow moves to an end operation and the method 400 ends.

Figure 5:
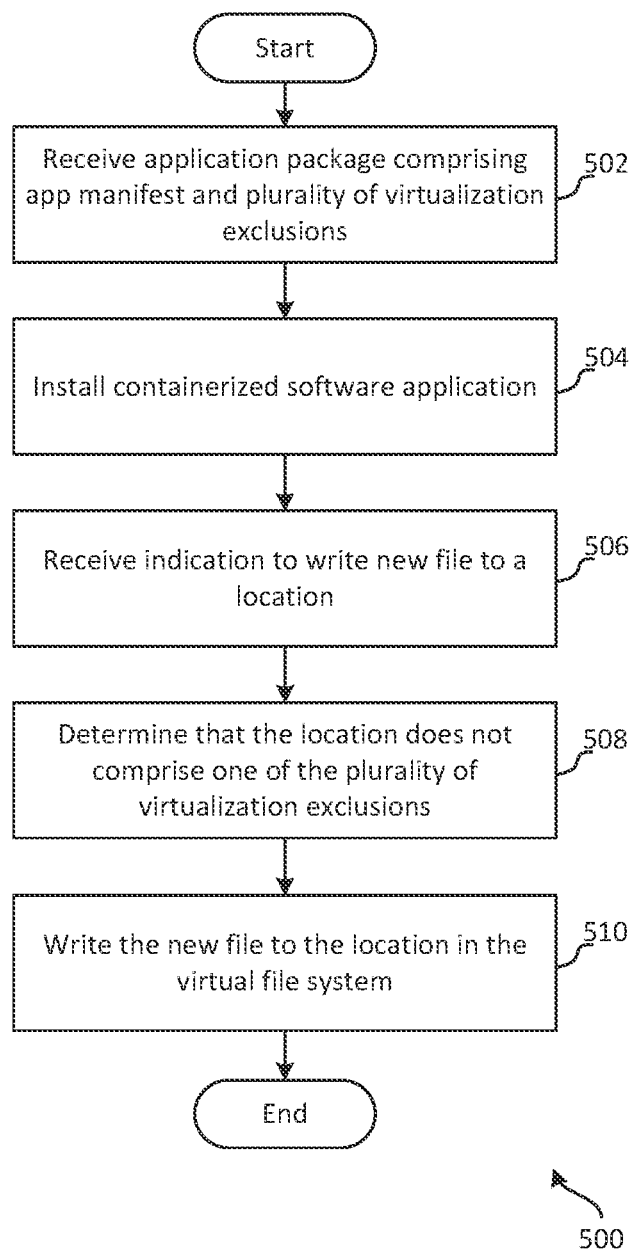
FIG. 5 is another exemplary method for selectively virtualizing data for a containerized software application.

FIG. 5 is another exemplary method 500 for selectively virtualizing data for a containerized software application. The method 500 begins at a start operation and flow moves to operation 502.

At operation 502 an application package for a containerized software application is received by a computing device. The application package may comprise an application manifest and a plurality of virtualization exclusions for a first location of a global file system of the computing device. The application may be downloaded from an application store, from a website, or from a different storage location (e.g., a USB drive, a connected second computing device). The application manifest may comprise manifest data, a container definition, and the plurality of virtualized exclusions, amongst other data. The manifest data may comprise information a computer system needs to deploy, display, and update the containerized software application. This information may include package identity, package dependencies, required capabilities, visual elements, and extensibility points. In examples, the manifest data may be comprised in a document (e.g., XML file).

From operation 502 flow continues to operation 504 where the containerized software application is installed in a container comprising a virtual file system. In some examples, the container may also include a virtual registry. The container is an isolated, lightweight silo for running the application on the host operating system. The container may comprise a virtual file system and/or a virtual registry where writes made by the containerized software application may be made. The virtual file system and/or virtual registry may also include virtualized copies of the global file system and/or global registry.

From operation 504 flow continues to operation 506 where an indication to write a new file at a specific location is received. The indication may originate from the containerized application or from one or more other applications or programs of the computing device. The indication may be derived from a user input or from an automated action taken by the software application.

From operation 506 flow continues to operation 508 where a determination is made that the specific location does not comprise one of the plurality of virtualization exclusions. The determination may be made when a job object corresponding to the write indication analyzes a list of the virtualization exclusions for the containerized software application, and/or analyzes the container definition for the containerized software application.

From operation 508 flow continues to operation 510 where the new file is written to the specific location in the virtual file system based on the determination that the second location does not comprise one of the plurality of virtualization exclusions. That is, the containerized software application, in association with a write API and/or kernel driver determines that the location where the write is to take place is a virtualized file system location, and as such, the write is made to the virtualized file system location in the container rather than the global file system location.

From operation 510 flow moves to an end operation and the method 500 ends.

Figure 6:
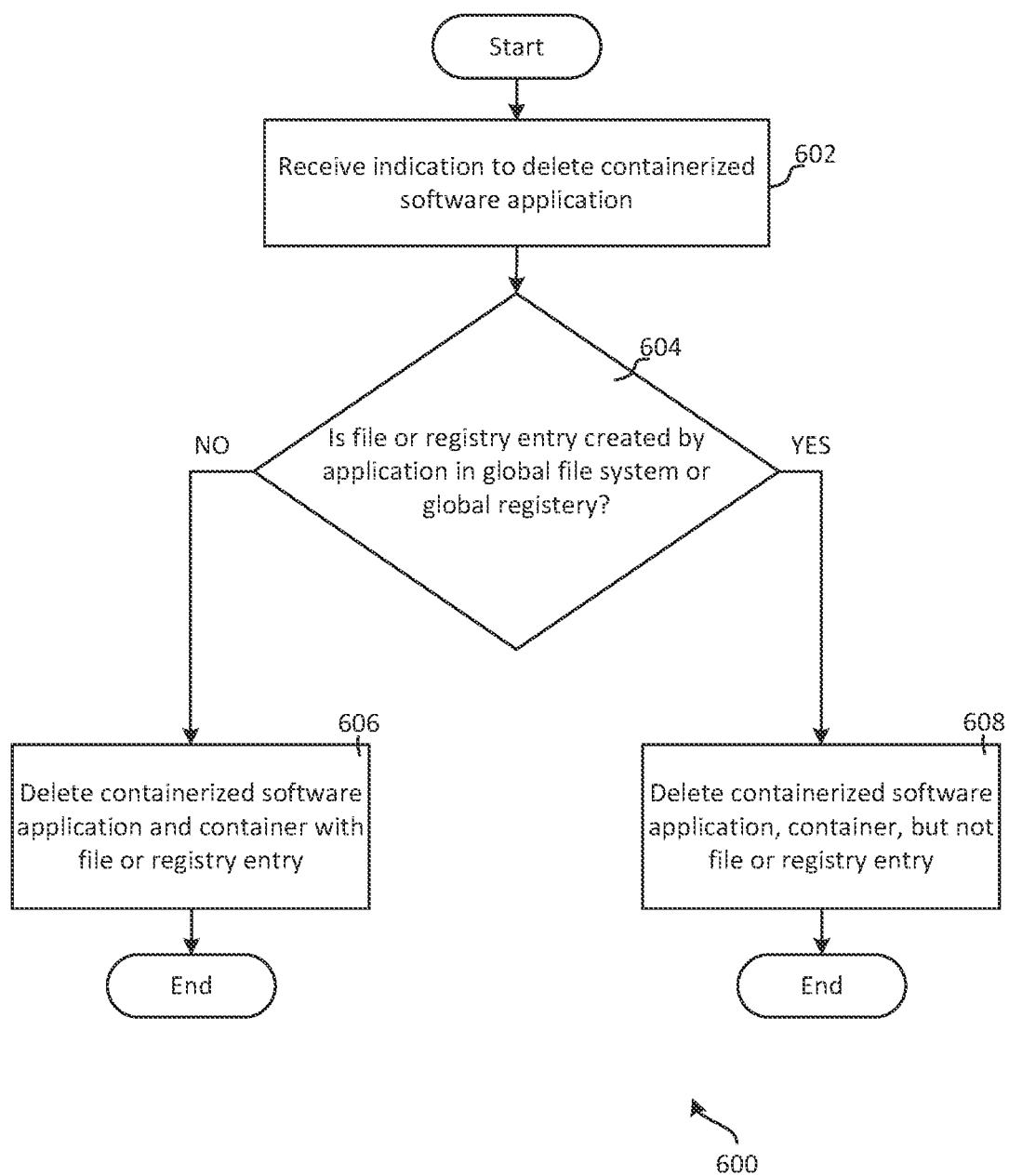
FIG. 6 is an exemplary method for selectively deleting data for a containerized software application.

FIG. 6 is an exemplary method 600 for selectively deleting data for a containerized software application. The method 600 begins at a start operation and flow moves to operation 602.

At operation 602 an indication to delete a containerized software application is received.

From operation 602 flow moves to operation 604 where a determination is made as to whether a file or registry entry created by the containerized application is in the global file system or the global registry. If at operation 604 a determination is made that the file or registry entry is in the global file system or global registry, the containerized software application and the container are deleted, but the file or registry entry is maintained in the global file system or the global registry, and the method 600 moves to an end operation. Other applications may thus continue to interact with and/or rely on the data in the maintained file or registry entry even after the containerized software application is deleted.

Alternatively, if at operation 604 a determination is made that the file or registry entry is not in the global file system or global registry (e.g., it is in a virtual file system location or virtual registry location), the containerized software application, the container, and the file or registry entry are deleted, and the method 600 moves to an end operation.

According to some examples, an application may specify (e.g., via the application manifest) that even files or registry entries that are written to the global file system or global registry by the application are to be deleted upon the application being uninstalled. Thus, in examples where the manifest for the application specifies that files or registry entries that are written to the global file system or global registry be deleted upon application uninstall, those files or registry entries may be deleted upon the application being uninstalled.

Figure 7:
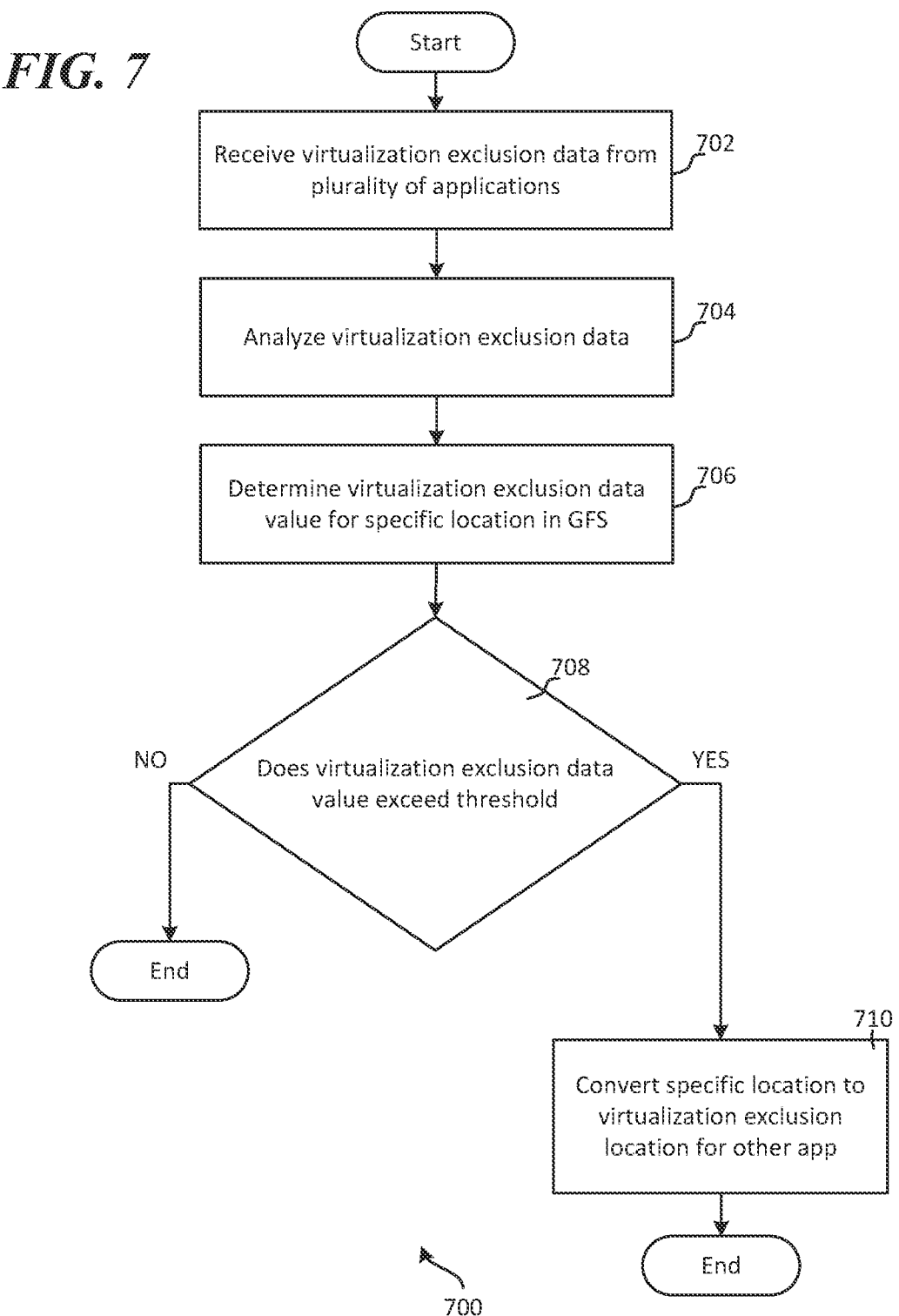
FIG. 7 is an exemplary method for automatically converting specific storage locations to virtualization exclusion locations for containerized software applications.

FIG. 7 is an exemplary method 700 for automatically converting specific storage locations to virtualization exclusion locations for containerized software applications. The method 700 begins at a start operation and flow moves to operation 702.

At operation 702 virtualization exclusion data from a plurality of containerized software applications is received. The virtualization exclusion data may include specific file system and/or registry locations that containerized software applications have excluded from virtualization. In additional examples, the virtualization exclusion data may comprise types of applications (e.g., gaming applications, game modification applications, system modification applications, productivity applications) that have excluded locations from virtualization, as well as the specific locations that those types of applications have excluded from virtualization. In some examples, an exclusion telemetry engine may determine a type of an application with a virtualization exclusion based on type data explicitly associated with the application (e.g., in the application manifest, in the application description) and/or based on application of one or more natural language processing models (e.g., word, phrase, sentence, paragraph, or page embeddings; keyword matching; phrase matching) to language associated with the application. In additional examples, one or more machine learning models (e.g., image neural networks, gated recurrent unit models, long short-term memory models) may be applied to content generated by or associated with an application to determine a type associated with it.

From operation 702 flow continues to operation 704 where the virtualization exclusion data is analyzed. The analysis may comprise determining a number, percentage, or ratio of applications of one or more types that include a virtualization exclusion for a specific location of a global file system and/or global registry.

From operation 704 flow continues to operation 706 where a virtualization exclusion data value for a specific location in the global file system is determined based on the analysis of the virtualization exclusion data. The virtualization exclusion data value may be the number, percentage, or ratio determined at operation 704, or it may be a result of a function (e.g., sigmoid, softmax) applied to the number, percentage, or ratio determined at operation 704.

From operation 706 flow continues to operation 708 where a determination is made as to whether the virtualization exclusion data value exceeds a threshold value. If a determination is made at operation 708 that the virtualization exclusion value does not exceed the threshold value, flow moves to an end operation and the method 700 ends. Alternatively, if a determination is made at operation 708 that the virtualization exclusion value does exceed the threshold value, flow moves to operation 710. As described above, the virtualization exclusion data value may correspond to a specific type of application, or it may correspond to one or more types of applications. In some examples, to move to operation 710 one or more additional factors may need to be met in addition to the determination being made that the virtualization exclusion data value exceeds a threshold value.

At operation 710 the specific location is automatically converted to a virtualization exclusion location for at least one other containerized software application. The conversion may include modifying the container definitions for the at least one other containerized software applications. In some examples, the at least one other containerized software applications may have to be of a same type or of a similar type as the type of applications that were determined to have the virtualization exclusion for the specific location. For example, if the virtualization exclusion value was determined for applications of a gaming type, the at least one other containerized software applications for which the specific location is automatically converted to a virtualization exclusion location may also have to be of a gaming type.

From operation 710 flow moves to an end operation and the method 700 ends.

Figure 8:
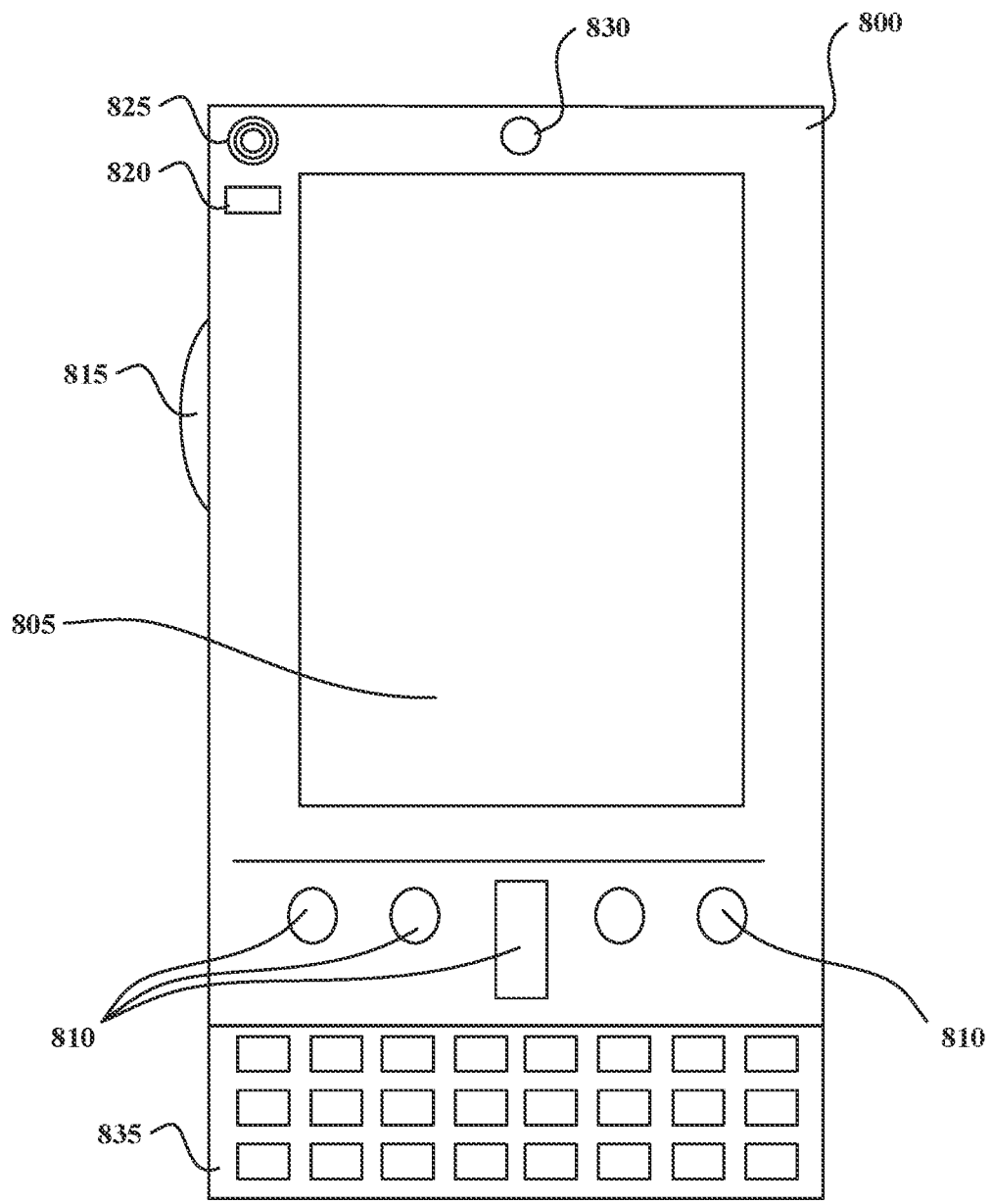
FIGS. 8 and 9 are simplified diagrams of a mobile computing device with which aspects of the disclosure may be practiced.
Figure 9:
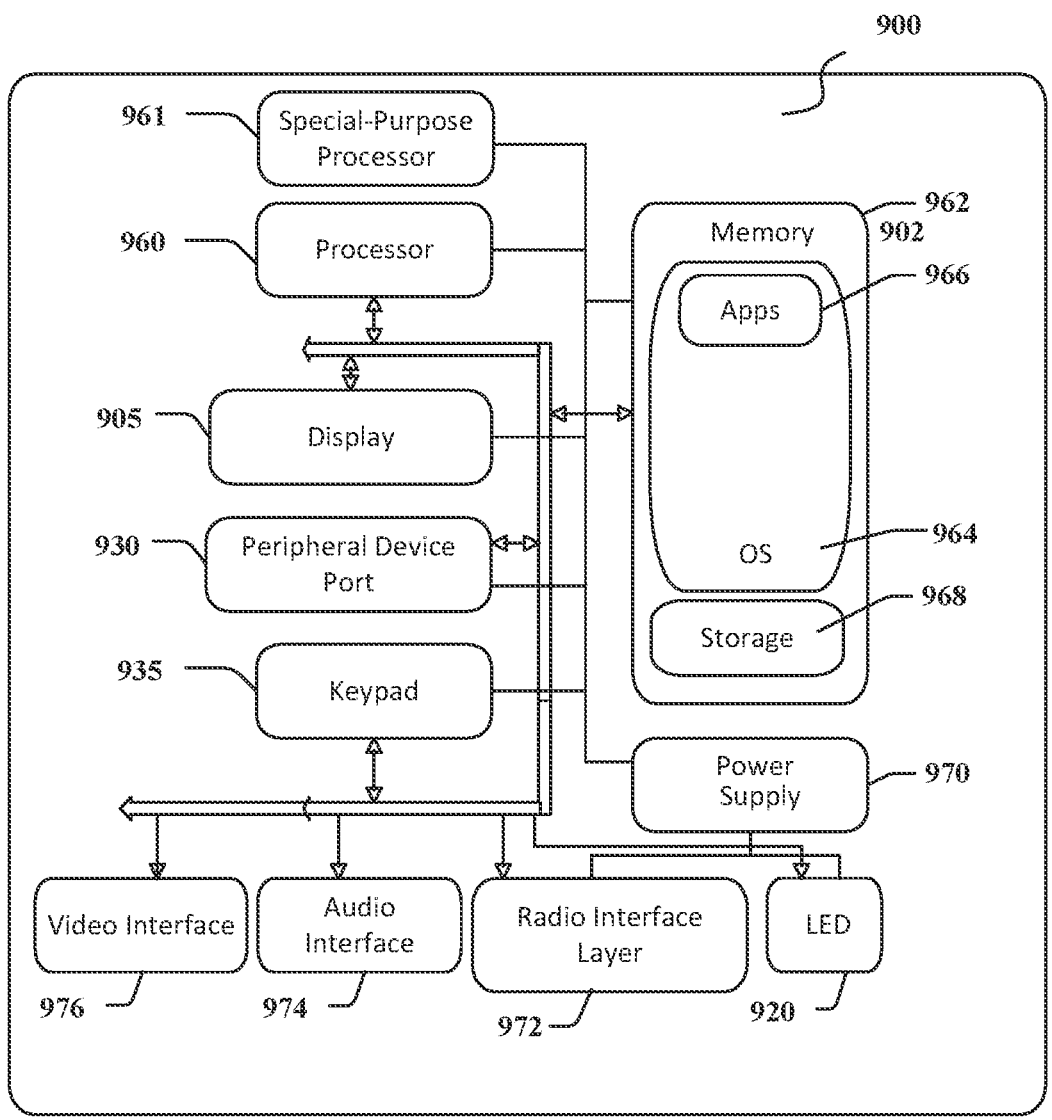

FIGS. 8 and 9 illustrate a mobile computing device 800, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 8, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or fewer input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 9 is a block diagram illustrating the architecture of one aspect of a mobile computing device. That is, the mobile computing device 900 can incorporate a system (e.g., an architecture) 902 to implement some aspects. In one embodiment, the system 902 is implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900, including instructions for providing and operating an asset disposition engine.

The system 902 has a power supply 970, which may be implemented as one or more batteries. The power supply 970 might further include an external power source, such as an AC adapter or a powered docking cradle that supplements or recharges the batteries.

The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 820 may be used to provide visual notifications, and/or an audio interface 974 may be used for producing audible notifications via the audio transducer 825. In the illustrated embodiment, the visual indicator 820 is a light emitting diode (LED) and the audio transducer 825 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 825, the audio interface 974 may also be coupled to a microphone to receive audible input, such as to facilitate a telephone conversation. In accordance with embodiments of the present disclosure, the microphone may also serve as an audio sensor to facilitate control of notifications, as will be described below. The system 902 may further include a video interface 976 that enables an operation of an on-board camera 830 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9 by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio interface layer 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio interface layer 972 or via a distributed computing network. Similarly, such data/information may be readily transferred between computing devices for storage and use according to well-known data/information transfer and storage means, including electronic mail and collaborative data/information sharing systems.

Figure 10:
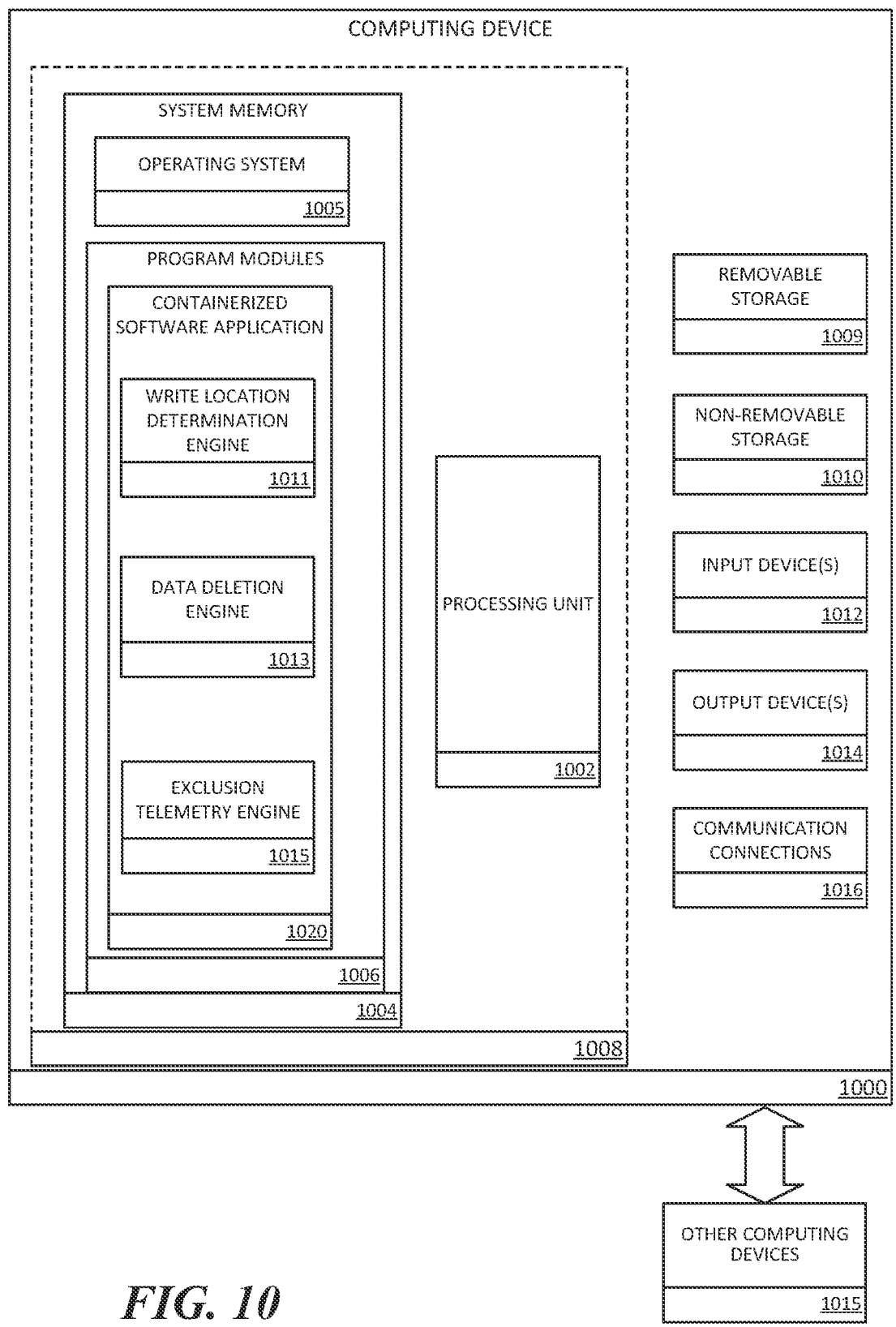
FIG. 10 is a block diagram illustrating example physical components of a computing device with which aspects of the disclosure may be practiced.

FIG. 10 is a block diagram illustrating physical components (e.g., hardware) of a computing device 1000 with which aspects of the disclosure may be practiced. The computing device components described below may have computer executable instructions for assisting with selectively virtualizing software application data. In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories. The system memory 1004 may include an operating system 1005 suitable for running one or more containerized software applications. The operating system 1005, for example, may be suitable for controlling the operation of the computing device 1000.

Furthermore, embodiments of the disclosure may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the processing unit 1002, the program modules 1006 (e.g., containerized software application 1020) may perform processes including, but not limited to, the aspects, as described herein. According to examples, write location determination engine 1011 may perform one or more operations associated with analyzing a container definition for a containerized software application and determining whether a virtualization exclusion exists for a location the containerized software application is trying to write to. Data deletion engine 1013 may perform one or more operations associated with deleting files and entries written by a containerized software application to virtualized locations, but not to files and entries written by a containerized software application to global locations. Exclusion telemetry engine 1015 may perform one or more operations including receiving virtualization exclusion data from a plurality of containerized software applications; analyzing the virtualization exclusion data; determining, based on the analysis of the virtualization exclusion data, a virtualization exclusion data value for a specific location in the global file system; determining that the virtualization exclusion data value exceeds a threshold value; and automatically converting the specific location to a virtualization exclusion location for at least one other containerized software application.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1000 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1000 may also have one or more input device(s) 1012 such as a keyboard, a mouse, a pen, a sound or voice input device, a touch or swipe input device, etc. The output device(s) 1014 such as a display, speakers, a printer, etc. may also be included. The aforementioned devices are examples and others may be used. The computing device 1000 may include one or more communication connections 1016 allowing communications with other computing devices 1050. Examples of suitable communication connections 1016 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1004, the removable storage device 1009, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000. Computer readable media and computer storage media as described herein does not include transitory media such as a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 11:
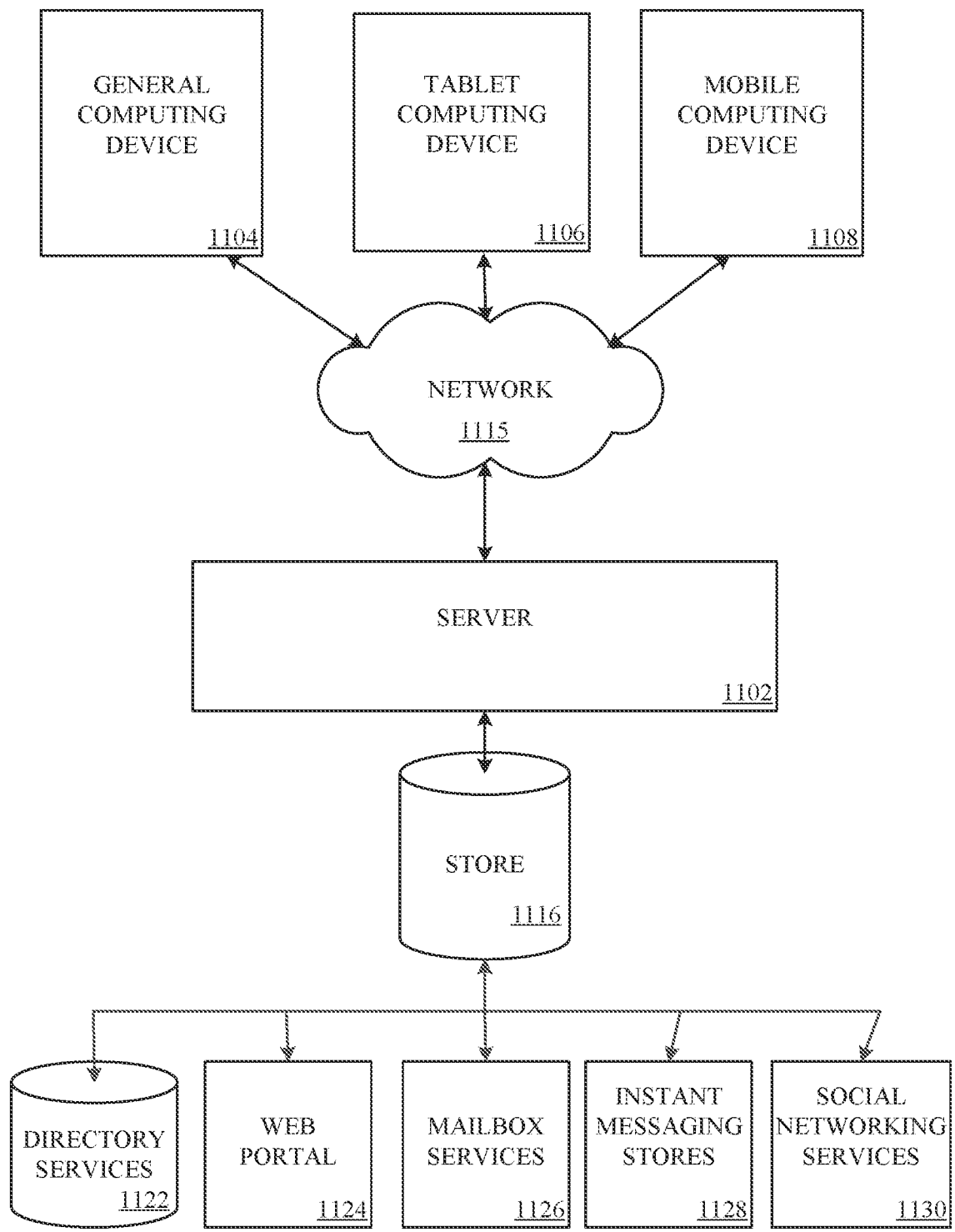
FIG. 11 is a simplified block diagram of a distributed computing system in which aspects of the present disclosure may be practiced.

FIG. 11 illustrates one aspect of the architecture of a system for processing data received at a computing system from a remote source, such as a personal/general computer 1104, tablet computing device 1106, or mobile computing device 1108, as described above. Content displayed at server device 1102 may be stored in different communication channels or other storage types. For example, various documents may be stored using a directory service 1122, a web portal 1124, a mailbox service 1126, an instant messaging store 1128, or a social networking site 1130. The program modules 1006 may be employed by a client that communicates with server device 1102, and/or the program modules 1006 may be employed by server device 1102. The server device 1102 may provide data to and from a client computing device such as a personal/general computer 1104, a tablet computing device 1106 and/or a mobile computing device 1108 (e.g., a smart phone) through a network 1115. By way of example, the computer system described above may be embodied in a personal/general computer 1104, a tablet computing device 1106 and/or a mobile computing device 1108 (e.g., a smart phone). Any of these embodiments of the computing devices may obtain content from the store 1116, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure. The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method for selectively virtualizing software application data, the method comprising:
receiving, by a computing device, a first application package for a first containerized software application, the first application package comprising a first application manifest and a first virtualization exclusion for a first location in a global file system of the computing device;
receiving, by the computing device, a second application package for a second containerized software application, the second application package comprising a second application manifest and a plurality of virtualization exclusions comprising locations in the global file system of the computing device, wherein the plurality of virtualization exclusions does not include the first location;
installing the first containerized software application in a first container comprising a first virtual file system;

installing the second containerized software application in a second container comprising a second virtual file system;
subsequent to the installations, receiving, by the first containerized software application, an indication to write a first new file at the first location and performing the steps:
determining that a percentage of applications of a same application type that all include the first location as a virtualization exclusion exceeds a threshold percentage value;
determining that the second containerized software application is of the same application type as the applications exceeding the threshold percentage;
based on determining the second containerized software application is of the same application type as the applications exceeding the threshold percentage, automatically converting the first location to a virtualization exclusion location for the second containerized software application;
determining that the first location comprises the first virtualization exclusion for the first containerized software application; and
writing, based on the determination that the first location comprises the first virtualization exclusion, the first new file to the first location in the global file system.

2. The computer-implemented method of claim 1, wherein the first location comprises a user-specific location for storing application data in the global file system.

3. The computer-implemented method of claim 1, further comprising:
receiving, by the second containerized software application, an indication to write a second new file to the first location;
determining that the first location is not one of the plurality of virtualization exclusions for the second containerized software application;
writing, based on the determination that the first location is not one of the plurality of virtualization exclusions, the second new file to the first location in the second virtual file system;
receiving, by the second containerized software application, an indication to write a third new file to a second location;
determining that the plurality of virtualization exclusions includes the second location; and
writing, based on the determination that the plurality of virtualization exclusions includes the second location, the third new file to the second location in the global file system.

4. The computer-implemented method of claim 3, further comprising:
receiving an indication to delete the second containerized software application;
deleting the second containerized software application, the second container, and the second new file; and
maintaining the third new file at the second location in the global file system.

5. The computer-implemented method of claim 1, further comprising:
receiving an indication from the first containerized software application to update the first new file; and
updating the first new file at the first location in the global file system based on the first location comprising the first virtualization exclusion for the first containerized software application.

6. The computer-implemented method of claim 3, further comprising:
receiving, from a third application, a request to access files written by the second containerized software application;
providing the third application with access to the third new file based on the third new file being written to the global file system; and
denying the third application access to the second new file based on the second new file being written to the second virtual file system.

7. The computer-implemented method of claim 1, wherein the first application package further comprises a second virtualization exclusion for a location in a global registry of the computing device.

8. The computer-implemented method of claim 7, wherein the second virtualization exclusion for the location in the global registry of the computing device comprises a user-specific location for storing registry data.

9. The computer-implemented method of claim 1, further comprising:
determining a type of the second containerized software application based on an analysis of information associated with the second containerized software application by a machine learning model.

10. The computer-implemented method of claim 1, further comprising:
receiving an indication to delete the first containerized software application;
determining that the first virtualization exclusion for the first location in the global file system is a write file only virtualization exclusion; and
deleting, based on the determination that the first virtualization exclusion for the first location in the global file system is the write file only virtualization exclusion, the first new file at the first location in the global file system.

11. A system for selectively virtualizing software application data, comprising:
a memory for storing executable program code; and
one or more processors, functionally coupled to the memory, the one or more processors being responsive to computer-executable instructions contained in the program code and operative to:
receive, by the system, a first application package for a first containerized software application, the first application package comprising a first application manifest and a first virtualization exclusion for a first location in a global file system of the system;
receive, by the system, a second application package for a second containerized software application, the second application package comprising a second application manifest and a plurality of virtualization exclusions comprising locations in the global file system of the system, wherein the plurality of virtualization exclusions does not include the first location;
install the first containerized software application in a first container comprising a first virtual file system;
install the second containerized software application in a second container comprising a second virtual file system;
subsequent to the installations, receive, by the first containerized software application, an indication to write a first new file at the first location and perform the steps of:

determine that a percentage of applications of a same application type that all include the first location as a virtualization exclusion exceeds a threshold percentage value;

determine that the second containerized software application is of the same application type as the applications exceeding the threshold percentage;

based on determining the second containerized software application is of the same application type as the applications exceeding the threshold percentage, automatically convert the first location to a virtualization exclusion location for the second containerized software application;

determine that the first location comprises the first virtualization exclusion for the first containerized software application; and write, based on the determination that the first location comprises the first virtualization exclusion, the first new file to the first location in the global file system.

12. The system of claim 11, wherein the first location comprises a user-specific location for storing application data in the global file system.

13. The system of claim 11 wherein the processors are further responsive to the computer-executable instructions contained in the program code and operative to:

receive, by the second containerized software application, an indication to write a second new file to the first location;

determine that the first location is not one of the plurality of virtualization exclusions for the second containerized software application;

write, based on the determination that the first location is not one of the plurality of virtualization exclusions, the second new file to the first location in the second virtual file system;

receive, by the second containerized software application, an indication to write a third new file to a second location;

determine that the plurality of virtualization exclusions includes the second location; and write, based on the determination that the plurality of virtualization exclusions includes the second location, the third new file to the second location in the global file system.

14. The system of claim 13, wherein the processors are further responsive to the computer-executable instructions contained in the program code and operative to:

receive an indication to delete the second containerized software application;

delete the second containerized software application, the second container, and the second new file; and maintain the third new file at the second location in the global file system.

15. The system of claim 13, wherein the processors are further responsive to the computer-executable instructions contained in the program code and operative to:

receive, from a third application, a request to access files written by the second containerized software application;

provide the third application with access to the third new file based on the third new file being written to the global file system; and deny the third application access to the second new file based on the second new file being written to the second virtual file system.

16. The system of claim 11, wherein the processors are further responsive to the computer-executable instructions contained in the program code and operative to:

determine a type of the second containerized software application based on an analysis of information associated with the second containerized software application by a machine learning model.

17. The system of claim 11, wherein the processors are further responsive to the computer-executable instructions contained in the program code and operative to:

receive an indication to delete the first containerized software application;

determine that the first virtualization exclusion for the first location in the global file system is a write file only virtualization exclusion; and delete, based on the determination that the first virtualization exclusion for the first location in the global file system is the write file only virtualization exclusion, the first new file at the first location in the global file system.

18. A computer-readable storage device comprising executable instructions that, when executed by one or more processors, assists with selectively virtualizing software application data, the computer-readable storage device including instructions executable by the one or more processors for:

receiving a first application package for a first containerized software application, the first application package comprising a first application manifest and a first virtualization exclusion for a first location in a global file system of the computer-readable storage device;

receiving a second application package for a second containerized software application, the second application package comprising a second application manifest and a plurality of virtualization exclusions comprising locations in the global file system of the computer-readable storage device, wherein the plurality of virtualization exclusions does not include the first location;

installing the first containerized software application in a first container comprising a first virtual file system;

installing the second containerized software application in a second container comprising a second virtual file system;

subsequent to the installations, receiving, by the first containerized software application, an indication to write a first new file at the first location and performing the steps of:

determining that a percentage of applications of a same application type that all include the first location as a virtualization exclusion exceeds a threshold percentage value;

determining that the second containerized software application is of the same application type as the applications exceeding the threshold percentage;

based on determining the second containerized software application is of the same application type as the applications exceeding the threshold percentage, automatically converting the first location to a virtualization exclusion location for the second containerized software application;

determining that the first location comprises the first virtualization exclusion for the first containerized software application; and writing, based on the determination that the first location comprises the first virtualization exclusion, the first new file to the first location in the global file system.

19. The computer-readable storage device of claim 18, wherein the first location comprises a user-specific location for storing application data in the global file system.

20. The computer-readable storage device of claim 18, wherein the instructions are further executable by the one or more processors for:
- receiving, by the second containerized software application, an indication to write a second new file to the first location;
- determining that the first location is not one of the plurality of virtualization exclusions for the second containerized software application; and
- writing, based on the determination that the first location is not one of the plurality of virtualization exclusions, the second new file to the first location in the second virtual file system.

* * * * *